Patented Aug. 18, 1925.

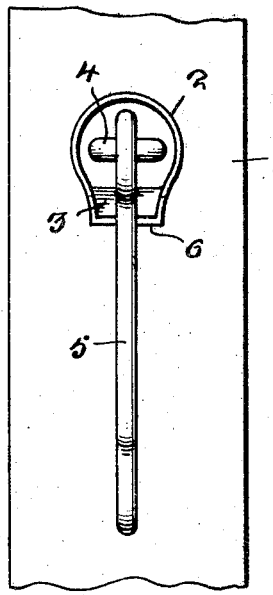
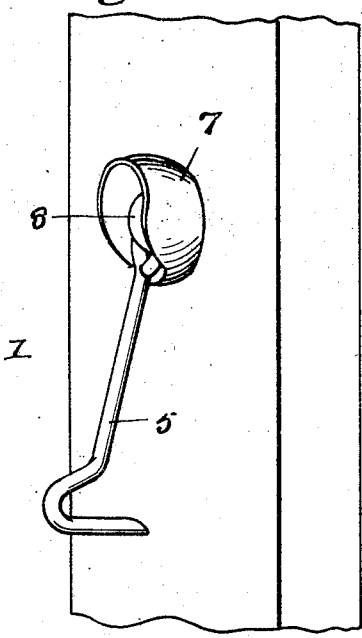
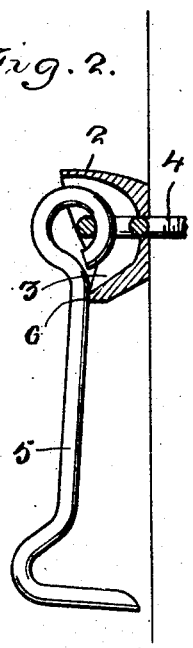
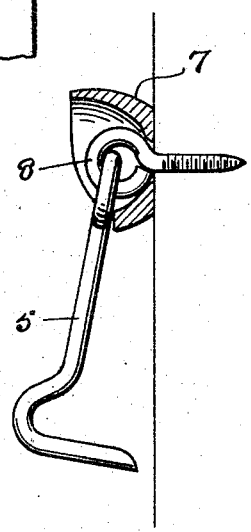
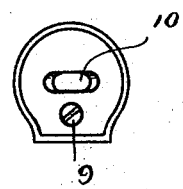

1,550,059

UNITED STATES PATENT OFFICE.

ARTHUR E. CLEVETT, OF SPOKANE, WASHINGTON.

HOOK GUARD.

Application filed September 6, 1923. Serial No. 661,259.

*To all whom it may concern:*

Be it known that I, ARTHUR E. CLEVETT, a citizen of the United States, residing at Spokane, in the county of Spokane and State of Washington, have invented new and useful Improvements in Hook Guards, of which the following is a specification.

My present invention has reference to a guard for hooks employed for latching-screen and other doors.

My object is to produce an extremely simple and cheaply constructed guard which permits the hook hanging vertically therefrom so that the point of the hook will be sustained in a position to prevent tearing of garments or laceration of flesh which commonly occurs with such hooks when not provided with the guard, and also wherein the hook is held from twisting on the eye that secures the same to the door or to the door jamb, and further wherein the hook is sustained out of contact with the door or jamb so that the same cannot inflict injury thereto but which hook may be readily grasped by the operator when the door is to be latched.

The drawing which accompanies and which forms part of this application illustrates a satisfactory embodiment of the improvement reduced to practice, and wherein:—

Figure 1 is a front elevation showing a door hook suspended from a guard in accordance with this invention.

Figure 2 is an approximately central vertical longitudinal sectional view therethrough.

Figure 3 is a perspective view of a slight modification.

Figure 4 is a central vertical section through the guard.

Figure 5 is a front elevation of a slightly modified form of guard.

The guard may be either attached to a swinging door or to the jamb for the door.

In the showing of the drawing, I have illustrated the same attached to a door 1. The guard comprises a substantially cup-shaped body member 2 preferably formed of metal, and having its inner face flat and its outer and open face gradually inclined inwardly from its top to its straight bottom. The bottom of the guard 2 is preferably arranged at a downward angle, or at least the inner wall thereof is downwardly inclined, as at 3. The straight lower wall of the body member is disposed a considerable distance inwardly with respect to the upper rounded wall of the said body.

The guard is centrally formed with an opening through which is passed the screw eye 4 for the door hook 5. The screw eye holds the guard on the door.

The screw eye is preferably arranged rightangularly with respect to the vertical plane of the guard so that the pointed end of the hook, when the latter is pendent from the screw eye, will be projected toward but held out of contact with the door. Because of the contacting engagement of the shank of the hook with the lip 6 provided by the lower straight wall of the guard, such contact between the hook and door is prevented. The hook is positioned so that the pointed end thereof cannot inflict injury to the clothes or flesh of persons which may be brought into contact with the side of the hook, and the same is so hung that it may be readily grasped and brought to latching engagement with the screw eye provided therefor on the door jamb or casing.

In Figures 3 and 4 the guard 7 is substantially similar to that above described, but the hook supporting eye 8 is arranged vertically therein.

In Figure 5, the guard is provided with a screw opening 9 arranged to one side of the elongated opening 10 through which the screw eye passes. By inserting the screw through the opening 9 the guard will be effectively held positioned, and its removal by unscrupulous persons will be prevented.

Having described the invention I claim:—

A guard for door hooks comprising a substantially cup-shaped body member whose lower wall is straight and whose sides and outer edge merge inwardly to the said straight bottom wall, said body designed to have a screw eye centrally passed therethrough for holding the same upon a support and for arranging the eye of the screw wholly in the body, and a hook swiveled on the screw eye and normally contacting with the lower straight and reduced wall of the body.

In testimony whereof I affix my signature.

ARTHUR E. CLEVETT.